US008511128B2

(12) United States Patent
Boepple

(10) Patent No.: US 8,511,128 B2
(45) Date of Patent: Aug. 20, 2013

(54) EJECTION OF RESIDUAL PARTS FROM PLATE-TYPE WORKPIECES

(75) Inventor: Andreas Boepple, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 806 days.

(21) Appl. No.: 12/405,435

(22) Filed: Mar. 17, 2009

(65) Prior Publication Data
US 2009/0235714 A1  Sep. 24, 2009

(30) Foreign Application Priority Data

Mar. 19, 2008 (DE) .............. 20 2008 003 915 U

(51) Int. Cl.
*B21D 31/02* (2006.01)
*B21D 45/00* (2006.01)

(52) U.S. Cl.
USPC .............. 72/328; 72/427; 72/344; 72/326

(58) Field of Classification Search
USPC ............ 72/344, 326, 328, 334, 345, 346, 72/361, 426, 427; 83/549, 552, 563; 234/111, 234/113, 114
See application file for complete search history.

(56) References Cited

U.S. PATENT DOCUMENTS

| | | | | |
|---|---|---|---|---|
| 1,746,498 A * | 2/1930 | Rabold, Sr. | | 72/328 |
| 1,812,023 A * | 6/1931 | Seavey | | 72/328 |
| 2,374,596 A * | 4/1945 | Frederick | | 72/347 |
| 2,625,896 A * | 1/1953 | Immenroth | | 72/346 |
| 2,645,815 A * | 7/1953 | Quarnstrom | | 249/205 |
| 3,079,823 A * | 3/1963 | Ekstrom | | 83/111 |
| 3,387,543 A * | 6/1968 | Beckers | | 72/339 |
| 3,635,069 A * | 1/1972 | Eickenhorst | | 72/345 |
| 3,995,469 A * | 12/1976 | Ames | | 72/328 |
| 4,220,062 A * | 9/1980 | Blanz | | 83/76.6 |
| 4,327,571 A * | 5/1982 | Cavanaugh | | 72/344 |
| 4,555,966 A | 12/1985 | Klingel | | |
| 4,569,267 A * | 2/1986 | Klingel | | 83/552 |
| 4,862,782 A * | 9/1989 | Ernst | | 83/552 |
| 5,062,337 A * | 11/1991 | Johnson et al. | | 83/552 |
| 5,072,620 A * | 12/1991 | Hill et al. | | 72/414 |
| 5,263,237 A * | 11/1993 | Gallant et al. | | 29/402.06 |
| 5,299,477 A * | 4/1994 | Miyajima | | 83/13 |
| 5,351,589 A * | 10/1994 | Creaden | | 83/678 |
| 5,382,102 A * | 1/1995 | Brolund et al. | | 400/134 |
| 5,390,575 A * | 2/1995 | Saito | | 83/140 |
| 5,507,166 A * | 4/1996 | Orlick et al. | | 72/344 |
| 5,901,628 A * | 5/1999 | Sakamoto et al. | | 83/552 |
| 6,675,688 B2 * | 1/2004 | Ostini | | 83/552 |
| 7,328,640 B2 * | 2/2008 | Yeh | | 83/549 |

(Continued)

FOREIGN PATENT DOCUMENTS

DE 102005005214 8/2006

*Primary Examiner* — Dana Ross
*Assistant Examiner* — Lawrence Averick
(74) *Attorney, Agent, or Firm* — Fish & Richardson P.C.

(57) ABSTRACT

A plate-type workpiece part ejector tool includes an upper tool portion and a lower tool portion. The upper tool portion includes a tool body, and a plurality of cutting tools that carried by the tool body. Each of the cutting tools includes a guide body having a punch. The lower tool portion has a single ejection opening. The ejection opening has at least one counter-cutting edge. The cutting tools are accommodated in the tool body so as to be movable relative to the lower tool portion, such that each of the cutting tools is optionally alignable with the counter cutting-edge.

17 Claims, 5 Drawing Sheets

(56) References Cited

U.S. PATENT DOCUMENTS

| | | | |
|---|---|---|---|
| 7,721,634 B2* | 5/2010 | Komiya | 83/552 |
| 7,726,554 B2* | 6/2010 | Thielges et al. | 234/43 |
| 7,765,847 B2* | 8/2010 | Michonski | 72/344 |
| 2001/0025556 A1* | 10/2001 | Ostini | 83/552 |
| 2001/0039867 A1* | 11/2001 | Ostini | 83/552 |
| 2002/0038589 A1* | 4/2002 | Kawai | 83/164 |
| 2002/0162440 A1* | 11/2002 | Ostini | 83/552 |
| 2006/0123873 A1* | 6/2006 | Horobec | 72/361 |
| 2008/0092711 A1* | 4/2008 | Thielges et al. | 83/552 |
| 2008/0105022 A1* | 5/2008 | Michonski | 72/344 |
| 2008/0276783 A1* | 11/2008 | Komiya | 83/691 |
| 2009/0078022 A1* | 3/2009 | Miceli et al. | 72/478 |
| 2011/0005363 A1* | 1/2011 | Wang | 83/549 |
| 2011/0107888 A1* | 5/2011 | Thielges et al. | 83/139 |

\* cited by examiner

EJECTION OF RESIDUAL PARTS FROM PLATE-TYPE WORKPIECES

CROSS-RELATION OF RELATED APPLICATION

This application claims priority under 35 U.S.C. §119(a) to German Application No. 20 2008 003 915.0, filed on Mar. 19, 2008, the entire contents of which are hereby incorporated by reference.

TECHNICAL FIELD

This disclosure relates to a plate-type workpiece part ejector tool, such as for ejecting workpieces cut by a cutting beam that have at least one residual part in a sheet-metal plate.

BACKGROUND

Some machine tools are used for machining plate-type materials, in particular sheet metals, or sheet-metal plates. In known machine tools, the machining of the plate-type material is often effected with the use of a cutting beam, such as a laser beam. During such machining, workpieces of differing sizes are produced, as well as residual or waste parts. Very large residual parts can be disposed of, for example, through a flap in the machine base of the machine tools, into a collecting receptacle. After the residual part has been fully detached from the plate-type material, or the sheet-metal plate, such a flap swivels downwards, such that the residual part can slide away downwards. Alternatively, for large residual parts, provision can also be made whereby these parts can be removed by suction extraction or manually removed. Very small residual or waste parts can likewise be disposed of in an operationally reliable manner, since these parts can be drawn out of the sheet-metal plate by suction extraction. These methods, however, may not be as effective for the discharge of medial, or middle-sized, residual parts and of residual parts that have a complicated geometry, since these residual parts often cannot be disposed of via the flap solely through gravity. Suction extraction likewise may not possible, or may only be possible to a limited extent, since these residual parts can become caught on one another. Moreover, such medial residual parts often have an asymmetric center of gravity, such that these parts can become caught in the workpiece during suction extraction.

In some cases, provision can be made for disposing of medial, or middle sized residual parts and of residual parts that have a complicated geometry, whereby these parts are initially held by a micro-web, or micro-joint, to the workpiece (e.g., sheet-metal plate). Such a micro-joint is a small web, usually having a web width of between 0.5 mm and 1 mm, which fixes the residual part to the cut-out contour or sub-area of the sheet-metal plate. Then, depending on the geometry of the workpiece to which the residual part is joined by the micro-joint, an ejector tool having a square die or an ejector tool having a round die is used. The ejector tool typically includes a single punching tool that includes a punch, which projects, relative to a basic body, in the direction of a die. This punch can be positioned in differing punching positions through manual pre-setting of the basic body. Assigned to this cutting tool is a die having an ejection opening, which is larger by a multiple than the punching area of the punch. A square die can be used for straight contours on the sub-area to which the micro-joint is attached. If the micro-joint is attached to a curved contour of the sub-area, a round die can be used instead of the square die. Thus, depending on the particular counters of the sub-area to which the micro-joint is attached, it may be necessary to change the ejector tools, and it may be necessary to change the dies having ejection openings of differing sizes, in order to dispose of residual parts of differing sizes through the die. Moreover, it may be necessary to manually pre-set the position of the punch for a subsequent ejection process.

SUMMARY

In general, this invention relates to a plate-type workpiece part ejector tool, such as for ejecting pieces cut by a cutting beam that have at least one residual part in a sheet-metal plate.

One aspect of the invention provides a plate-type work piece part ejector tool that includes an upper tool portion and a lower tool portion. The upper tool portion includes a tool body, and a plurality of cutting tools carried by the tool body. Each of the cutting tools includes a guide body having a punch The lower tool portion has a single ejection opening that includes at least one counter-cutting edge. The cutting tools are accommodated in the tool body so as to be movable relative to the lower tool portion, such that each of the cutting tools is optionally alignable with the counter cutting-edge.

In some embodiments, the ejection opening has a plurality of counter-cutting edges, and the number of counter-cutting edges corresponds to the number of punches.

In some embodiments each of the punches includes a cutting edge, and the counter-cutting edges are arranged in a pattern that surrounds the cutting edges of the punches.

In some embodiment, the ejection opening has a plurality of counter-cutting edges, and the cutting tools are accommodated in the tool body so as to be movable relative to the lower tool portion, such that each of the cutting tools is optionally alignable with each of the counter cutting-edges.

In some embodiments, at least one of the cutting tools is configured such that a longitudinal central axis of its punch is arranged eccentrically relative to a longitudinal central axis of its guide body.

In some embodiments, the plurality of cutting tools are arranged in a pattern corresponding to a circle, and longitudinal central axes of the punches are arranged with a radially outward offset in relation to the circle.

In some embodiment, at least one of the cutting tools includes a round punch, and a cutting edge of the round punch can be aligned such that the cutting edge is tangent to the counter-cutting edge, and a normal of the counter-cutting edge intersects a longitudinal central axis of the guide body of the corresponding cutting tool.

In some embodiments, at least one of the cutting tools includes a rectangular punch, and a cutting edge of the rectangular punch can be aligned such that the cutting edge is parallelwise relative to the counter-cutting edge of the punch, and a normal of the counter-cutting edge intersects a longitudinal central axis of the guide body of the corresponding cutting tool.

In some embodiments, the ejection opening has a plurality of counter-cutting edges and an indentation between two adjacent ones of the counter-cutting edges, and the indentation is an enlarged region of the ejection opening.

In some embodiments, at least one of the guide bodies includes a positioning device that positions the corresponding guide body in a torsion-resistant and axially displaceable manner in the tool body.

Another aspect of the invention features a method of ejecting residual parts from a machined plate-type workpiece. The method includes selecting one of a plurality of punches carried by an upper tool portion of an ejector tool, selecting one of a plurality of counter-cutting edges provided on a lower tool portion of the ejector tool, positioning the selected punch and the selected counter-cutting edge relative to a micro-web on a plate-type workpiece, and utilizing the selected punch and the selected counter-cutting edge to severe the micro-web such that a residual part is separated from the plate-type work piece and is removed through an ejection opening in the lower tool portion.

In some embodiments, the method also includes cutting a gap in the plate-type workpiece, along a contour, to form a sub-area such that the residual part is produced after the cutting and remains joined to the workpiece by the micro-web, and positioning the selected punch and the selected counter-cutting edge relative to the micro-web includes positioning the selected punch and the selected counter-cutting edge relative to a contour of the sub-area in such a way that the contour of the sub-area is continuous after the micro-web is severed.

In another aspect, a plate-type workpiece part ejector tool includes an upper tool portion and a lower tool portion. The upper tool portion includes a tool body, and a plurality of cutting tools carried by the tool body. Each of the cutting tools includes a guide body having a punch that includes a cutting edge. The lower tool portion has a single ejection opening that includes a plurality of counter-cutting edges arranged in a pattern that surrounds the cutting edges of the punches. The cutting tools are accommodated in the tool body so as to be movable relative to the lower tool portion, such that each of the cutting tools is optionally alignable with each of the counter cutting-edges.

In some embodiments, at least one of the cutting tools is configured such that a longitudinal central axis of its punch is arranged eccentrically relative to a longitudinal central axis of its guide body.

In some embodiments, the plurality of cutting tools are arranged in a pattern corresponding to a circle, and longitudinal central axes of the punches are arranged with a radially outward offset in relation to the circle.

In some embodiments, at least one of the cutting tools incldues a round punch, and a cutting edge portion of the round punch can be aligned such that the cutting edge is tangent to a selected one of the counter-cutting edges, and a normal of the selected counter-cutting edge intersects a longitudinal central axis of the guide body of the corresponding cutting tool.

In some embodiments, at least one of the cutting tools includes a square or rectangular punch, and a cutting edge of the rectangular punch can be aligned such that the cutting edge is parallelwise relative to a selected one of the counter-cutting edges of the punch, and a normal of the selected counter-cutting edge intersects a longitudinal central axis of the guide body of the corresponding cutting tool.

In some embodiments, the ejection opening has an indentation between two adjacent ones of the counter-cutting edges, wherein the indentation is an enlarged region of the ejection opening.

In some embodiments, at least one of the guide bodies includes a positioning device that positions the corresponding guide body in a torsion-resistant and axially displaceable manner in the tool body.

Another aspect of the invention provides a plate-type workpiece part ejector tool that includes an upper tool portion and a lower tool portion. The upper tool portion can include a plurality of cutting tools, each respectively having a punch, which can have differing punch sizes and punch areas, and which can be provided in succession on a peripheral circle in a basic tool body. This arrangement can, for example, allow for a punch of an appropriate size and an appropriate geometry (e.g., round, square, rectangular, etc.) to be selected through a simple, machine-driven rotary motion of the basic tool body, in order to eject, in an operationally reliable manner, at least one residual part cut by a cutting beam and joined to a plate-type material by a micro-joint. A simple rotary motion of the basic tool body can provide for a high degree of flexibility in the selection of the punching geometries. The lower tool portion has a single ejection opening and at least one counter-cutting edge. Accordingly, there can always be an opposing counter-cutting edge of the lower tool for the purpose of severing the micro-joint, irrespective of the punch selected. Thus, a single ejector tool can be used to machine both a round and a straight contour of a cut sub-area in the plate-type material in which the micro-joint fixes the residual part in position. At the same time, the single ejection opening of the lower tool portion (lower tool or lower die) can be sufficiently large, such that residual parts that may be too large for suction extraction and too small for disposal downwards through a flap can be disposed of, in an operationally reliable manner, through the lower tool portion.

In some embodiments, the ejection opening has a plurality of counter-cutting edges. The number of counter-cutting edges in the lower tool portion can correspond to the number of punches in the upper tool portion.

In some embodiments, each of the punches can include a corresponding cutting edge, and the lower tool portion can include a plurality of counter-cutting edges that are arranged in a pattern defining an envelope that surrounds the cutting edges of the punches. This can allow for a shortened setting period for the positioning of the respective punch relative to the counter-cutting edge.

In some embodiments, at least one of the cutting tools is configured such that a longitudinal central axis of its punch is arranged eccentrically relative to a longitudinal central axis of its guide body. This can provide for an enlarged machining and ejection area. For example, a longitudinal central axis of the upper tool portion and a longitudinal central axis of the lower tool portion can lie in a common axis, and can remain fixedly aligned relative to one another during an ejection process. As compared with a punch arranged centrally relative to the guide body, an enlargement of the machining area is thus created, as a result of which larger residual parts can be disposed of through the lower tool in an operationally reliable manner. At the same time, the flexibility is also thereby increased. Owing to the limited outer circumference of such ejector tools, which may be restricted by the clearance available in a magazine, an enlargement of the machining area can be achieved through the eccentric arrangement in the case of an otherwise unaltered structure of the tool.

In some embodiments, at least one of the cutting tools includes a round punch. A cutting edge of the round punch can be aligned tangentially relative to the counter-cutting edge and such that a normal of the counter-cutting edge intersects a longitudinal central axis of the guide body of the corresponding cutting tool. This arrangement can allow micro-joints on round contours of a machined sheet-metal plate to be severed and ejected in an operationally reliable manner.

In some embodiments, at least one of the cutting tools includes a square or rectangular punch. A cutting edge of the square or rectangular punch can be aligned parallelwise relative to the counter-cutting edge of the punch and such that a normal of the counter-cutting edge intersects a longitudinal central axis of the guide body of the corresponding cutting tool. This arrangement can allow micro-joints on straight contours of a machined sheet-metal plate to be severed and ejected in an operationally reliable manner.

In some embodiments, one or more of the guide bodies of the cutting tools can have a positioning device. The positioning device(s) can be configured to accommodate the respective guide bodies in a torsion-resistant and axially displaceable manner in the basic tool body. This positioning device can be, for example, a tongue and groove joint, whereby the guide body is provided so as to be torsion-resistant relative to the basic tool body and, at the same time, an upward and downward movement can be rendered possible. This upward and downward movement may help to ensure that there is only one cutting tool provided in a working position or functional position at a time, whereas the other cutting tools can be moved into an inoperative position during the ejection process, such that these cutting tools sink into the basic tool body as soon as they contact a workpiece or residual part.

In some embodiments, one or more of the guide bodies of the cutting tools can include a flat portion that acts in conjunction with the basic tool body as a positioning device on the guide body. Again, torsional resistance and, at the same time, displaceability may thereby rendered possible. This positioning device can also help to ensure positionally correct mounting of the cutting tool, such that the punch is also mounted in the basic tool body with a radially outward offset relative to a longitudinal central axis of the upper tool portion.

Another aspect of the invention features a method of ejecting residual parts from a machined plate-type workpiece, in which a punch is selected from a plurality of punching tools of an upper tool portion and an appertaining counter-cutting edge of a lower tool portion is selected. The selected punch and the selected counter-cutting edge are positioned relative to a micro-web on a machined workpiece (e.g., a plate-type workpiece) such that the micro-web is severed and a residual part is removed through an ejection opening in the lower tool portion. As a result, smaller and medial residual parts that, for example, are too large for suction extraction and too small for disposal downwards through a flap, can be removed and disposed of, in an operationally reliable manner, through the lower tool portion.

In some embodiments, the selected punch and the appertaining, selected counter-cutting edge of the ejector tool are positioned relative to a contour of the sub-area in such a way that a contour course of a sub-area interrupted by the micro-web is continuous after the punching process (i.e., after the micro-web is severed). A contour course without discontinuity is thereby rendered possible. This is rendered possible, in particular, through the matching in the geometry of the punches.

Other aspects, features, and advantages are in the description, drawings, and claims.

DETAILED DESCRIPTION

Figure 1:
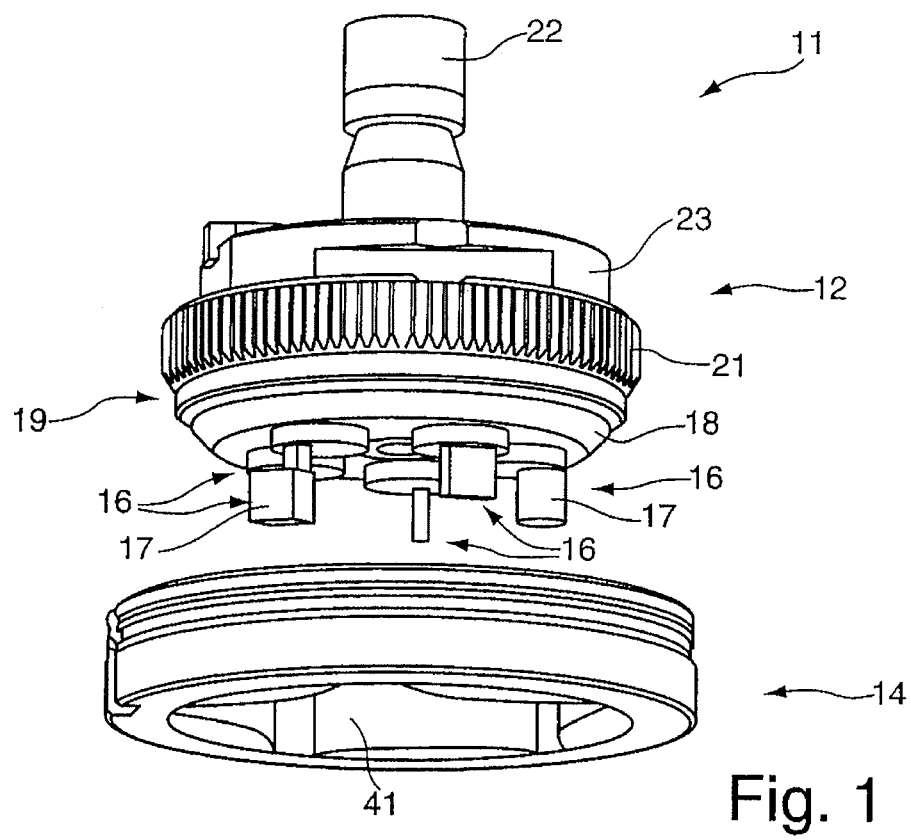
FIG. 1 is a perspective view of an ejector tool.
Figure 2:
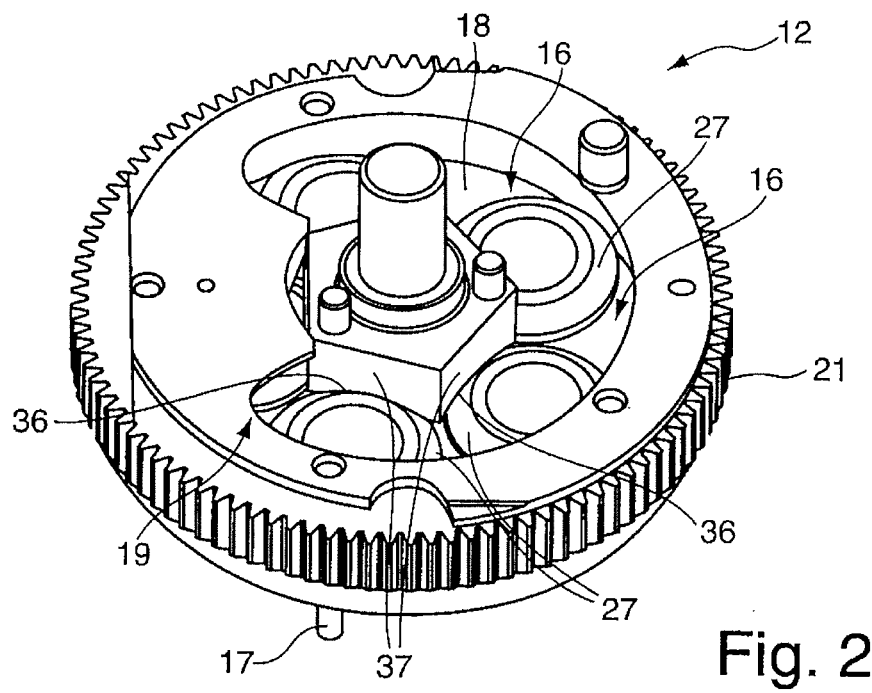
FIG. 2 is a perspective view of an upper tool portion of the ejector tool of FIG. 1.

Referring to FIG. 1, an ejector tool 11 includes an upper tool portion 12 (or upper tool) and a lower tool portion 14 (or lower tool or lower die). Such an ejector tool 11 can be used, for example, in the case of a machine tool described in FIG. 4 of DE 10 2005 005 214 A1, the complete disclosure of which is incorporated herein by reference. The upper tool portion 12 accommodates a plurality of cutting tools 16, each of which respectively has a punch 17. The respective geometries of each of the punches can differ from one another. As shown in FIG. 1, the punches 17 are oriented to face towards the lower tool portion 14.

The cutting tools 16 are accommodated on a basic tool body 18 (or tool body). This basic tool body 18 accommodates a control disc 19. On its exterior, the control disc 19 has external toothing 21 for the purpose of positioning the control disc 19 in its location relative to the cutting tools 16. A chucking spigot 22 is provided above the control disc 19. The chucking spigot is fixedly connected to the basic tool body 18, e.g., by a screwed connection (as illustrated in FIG. 3).

The cutting tools 16 are accommodated in a longitudinally displaceable manner in the basic tool body 18. As illustrated in FIG. 3, each of the cutting tools 16 includes a guide body 26 and a punch 17 arranged at a lower end of the guide body 26. At an opposite end of the guide body 26 is a full-perimeter shoulder 27, by which the associated cutting tool 16 is supported on the basic tool body 18 and is secured against falling out. The control disc 19 positions the punch that is represented on the left in FIG. 3 in a functional position 28, whereas the remaining punches 17 can be arranged in an inoperative position or non-working position. When in the non-working position, the punches 17, or cutting tools 16, can be arranged to be upwardly displaceable relative to the basic tool body 18, along their longitudinal central axis 29. For this purpose, a clearance 31 is provided between a cover 23 of the chucking spigot 22 and the basic tool body 18.

In some embodiments, the punches 17 are arranged symmetrically relative to their respective guide body 26, such that a longitudinal central axis 32 of the punch 17 is positioned in the longitudinal central axis 29 of the guide body 26. In such a case, a full-perimeter shoulder 27 can be provided on the guide body 26.

Figure 3:
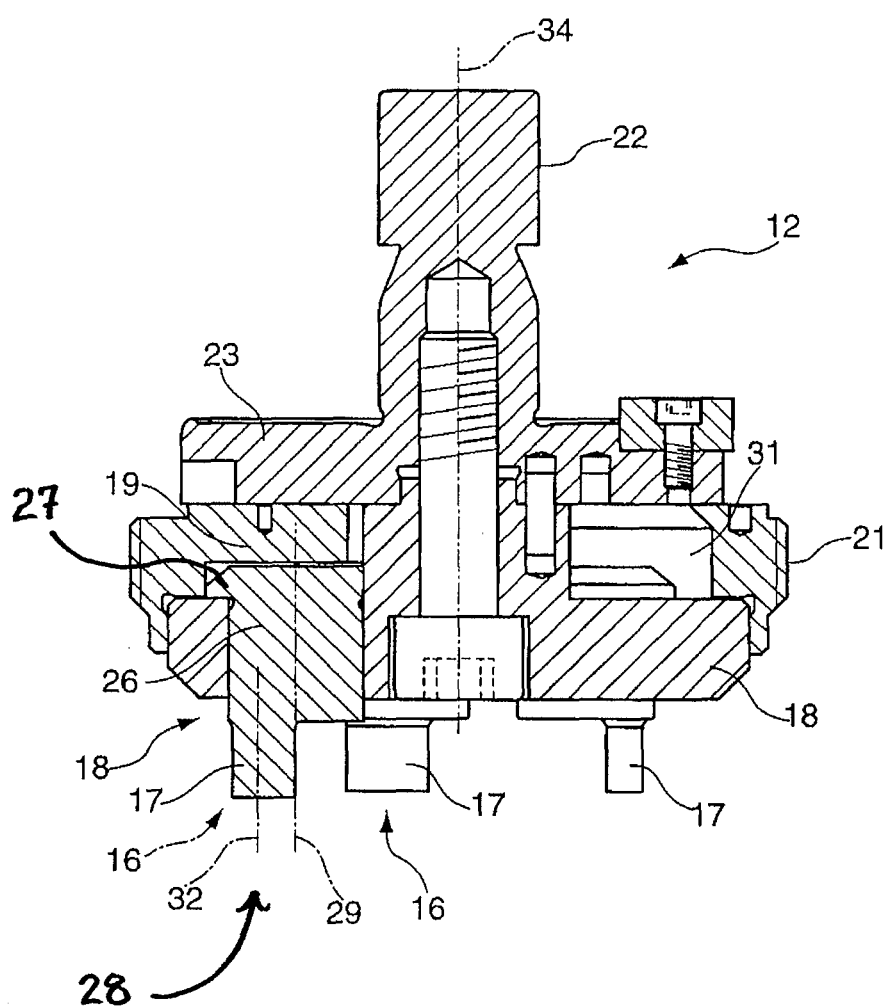
FIG. 3 is a cross-sectional side view of an upper tool portion of the ejector tool of FIG. 1

Alternatively or additionally, the punches 17 can be provided with a longitudinal central axis 32 that is eccentric relative to the longitudinal central axis 29 of the guide body 26, as illustrated in FIG. 3. In particular, the longitudinal central axes 32 of the punches 17 can be offset radially outwards relative to longitudinal central axes 29 of their respective guide bodies 26, or relative to the longitudinal central axis 34 of the upper tool portion 12. For the purpose of correctly positioning the eccentrically arranged punches 17, a positioning device 36 can be provided between the punches 17 and the basic tool body 18, so as to ensure a correctly positioned arrangement and maintenance of the correctly positioned arrangement. For example, the positioning device 36 can be a flat portion on a full-perimeter shoulder 27 of the associated guide body 26, which flat portion bears on a wall portion 37 of the basic tool body 18. The wall portion 37 can be of equal or greater magnitude than the stroke of the cutting tool 16.

Referring again to FIG. 1, the lower tool portion 14 includes a punch die, and has an ejection opening 41. All punches 17 of the cutting tools 16 can enter this ejection opening 41 during a working process.

Figure 4:
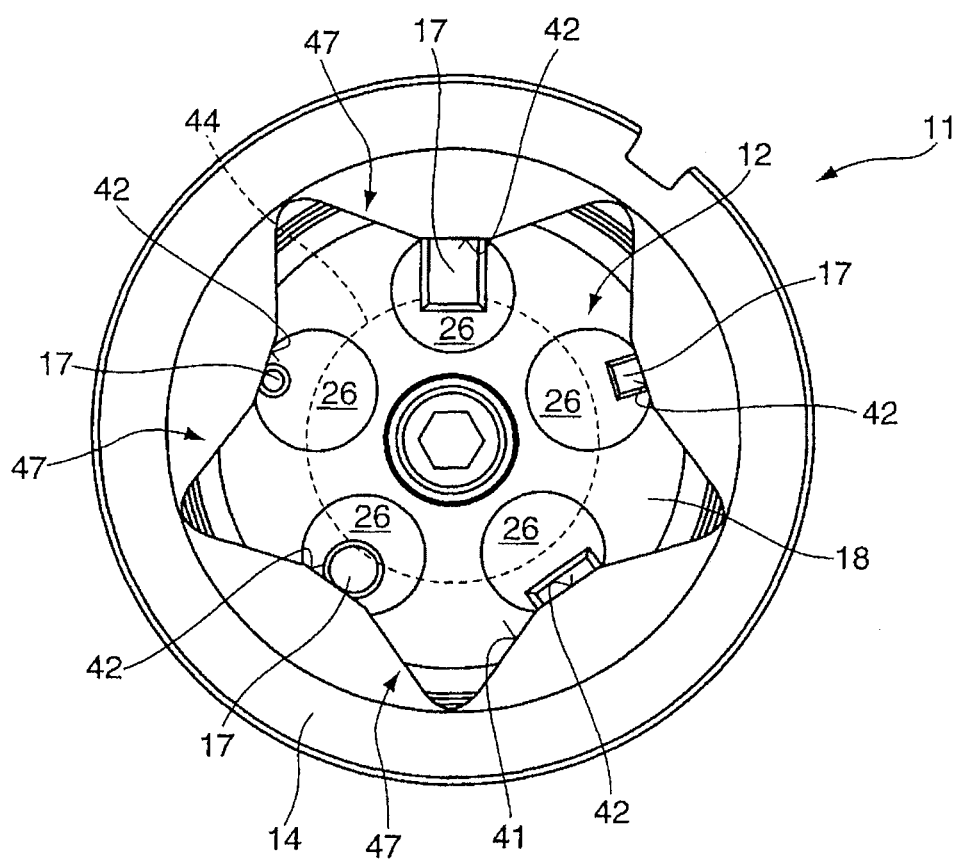
FIG. 4 is a bottom view of the ejector tool of FIG. 1.

FIG. 4 illustrates the differing geometries of the punches 17. At the same time, the eccentric arrangement of the longitudinal central axes 32 of the punches 17 in the guide body 26 becomes apparent. This eccentric arrangement of the punches 17, as compared with a central arrangement of the punches 17, relative to their respective guide bodies 26, can help to provide for an enlarged machining area. As a result, a larger configuration of the ejection opening 41 can be realized, the overall size of the ejector tool being unchanged.

As illustrated in FIG. 4, the ejection opening 41 comprises counter-cutting edges 42, which are rectilinear. These rectilinearly counter-cutting edges 42 can each be assigned to (e.g., aligned with) one of the cutting tools 16. Thus, the number of counter-cutting edges 42 can match the number of cutting tools 16. Since the cutting tools 16 are located on the same peripheral circle 44, an ejection process can be performed irrespective of the position of an individual punch 17, since a punch 17, for example a square punch, can be positioned at each of the represented positions, for example five positions, of the counter-cutting edges 42, for the purpose of performing a cutting process. The assignment of one of the counter-cutting edges 42 to a round punch 17 can allow for round contours of cut sub-areas to be cut in the sheet-metal plate, in which sub-areas the residual parts are held by micro-joints. In the case of a rectilinearly extending contour of a cut sub-area, rectangular or square punches can be.

The counter-cutting edges 42 are part of a full-perimeter ejection opening 41 of the lower tool portion 14. For the purpose of enlarging the working and ejection area, an indentation 47 can be arranged between two adjacent counter-cutting edges 42, in order to dispose also of larger residual parts or as great a variety of residual-part geometries as possible in an operationally reliable manner.

Figure 5:
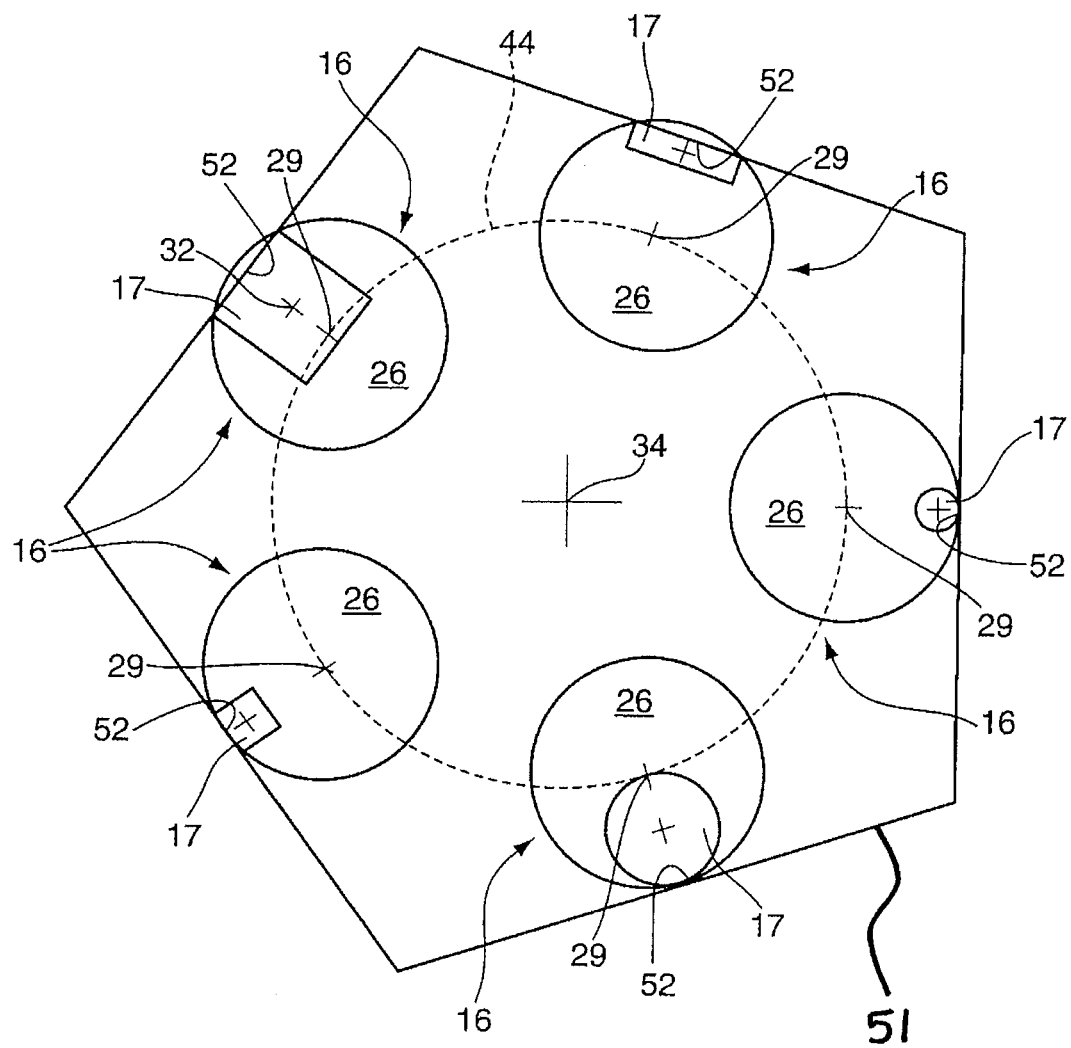
FIG. 5 is a schematic representation of an envelope surrounding punches of an upper tool portion of an ejector tool.

As illustrated in FIG. 5, the counter-cutting edges 42 of the lower tool portion 14 define an envelope 51 that outwardly encloses all cutting tools 16, or their punches 17. For example, in the case of five cutting tools 16, the envelope is realized as a pentagon. The number of cutting tools 16 preferably determines the number of cutting edges for the envelope 51. A cutting edge 52 of the square or rectangular punch 17 is aligned along a lateral edge of the envelope. In the case of punches 17 having a round geometry, there is a contact point between the cutting edge 52 and a lateral edge of the envelope. The lateral edge of the envelope is tangential to the cutting edge of the round punch. Such a configuration of the punches 17 in an upper tool portion 12 allows a geometry of a punch 17 to be optionally assignable to (e.g., optionally aligned with) one of the counter-cutting edges 42 arranged in the ejection opening 41. A high degree of flexibility can thus be achieved. At the same time, the enlargement of the machining space becomes apparent from FIG. 5, through consideration of the longitudinal central axis 29 of the guide bodies 26 and the radially outwardly offset spacing of the longitudinal central axes 32 of the punches 17. The number of cutting tools 16 in an upper tool portion 12 can include two or more cutting tools 16.

Figure 6:
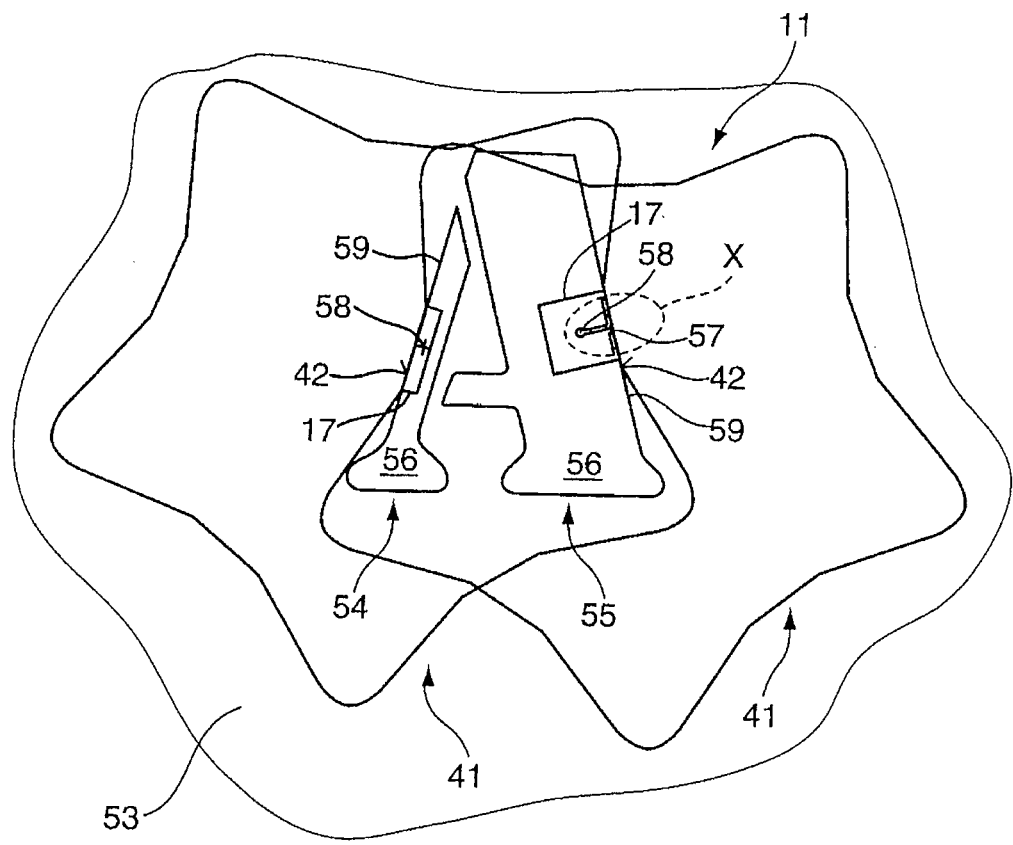
FIG. 6 is a schematic representation of a positioning of an ejector tool relative to a workpiece.
Figure 7:
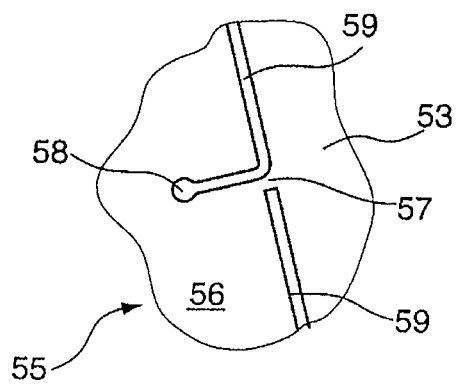
FIG. 7 is a schematic, enlarged view of region X of FIG. 6.

As illustrated in FIG. 6, a plate-type workpiece such as, for example, a sheet-metal plate 53, has been machined by a cutting beam, in particular a laser beam. For example, a letter A, which includes two sub-areas 54, 55, has been cut out. For the purpose of producing the sub-areas 54, 55, a laser beam punctures a residual part 56 remaining after the machining operation, for example at the location 58, and produces a cutting gap 59 along the provided contour, for the purpose of forming the respective sub-areas 54, 55. In this case, the cutting process is finished in such a way that a micro-joint or a micro-web 57 remains between the sheet-metal plate 53 and the residual part 56, as represented in FIG. 7, which shows an enlargement of the region X in FIG. 6. The residual part 56 is positioned in the represented position relative to the sub-area 54, 55. An ejector tool 11 is then assigned to the micro-joint 57, as represented in FIG. 6. A punch 17, for example a square punch, is positioned relative to the sub-area 55 in such a way that the counter-cutting edge 42 appertaining thereto is congruent with the straight contour of the sub-area 55, such that, during the ejection process, severing of the micro-joint 57 is effected and then at the same time a front face of the punch 17, without significant tilting, removes the residual part 56 downwards through the ejection opening 41 in an operationally reliable manner. It is thereby possible, at the same time, to prevent binding with the adjacent sub-area 55 in the case of only slight tilting of the residual part 56. An analogous process applies, for example, to the ejection of the residual part 56 of the sub-area 54, for which a rectangular punch 17 is used. If a different basic geometry of the punch 17 were then necessary for further, subsequent ejection processes, a different geometry of the punch 17 can be brought into use in a functional position 28 through simple rotation of the control disc 19. Residual parts 56 that are fixed in position, up until the ejection process, by a micro-joint 57, both on a straight and a curved contour of the sub-areas 54, 55, can thus be discharged without tool changing.

A number of embodiments of the invention have been described. Nevertheless, it will be understood that various modifications may be made without departing from the spirit and scope of the invention.

What is claimed is:

1. A plate-type work piece part ejector tool, comprising:
   an upper tool portion comprising:
      a tool body, and
      a plurality of cutting tools carried by the tool body, each of the cutting tools comprising a guide body having a punch; and
   a lower tool portion having a single ejection opening, the ejection opening having a plurality of counter-cutting edges,
   wherein the cutting tools are accommodated in the tool body so as to be movable relative to the lower tool portion, such that each of the cutting tools is optionally alignable with each of the counter cutting-edges.

2. The ejector tool of claim 1, wherein the number of counter-cutting edges corresponds to the number of punches.

3. The ejector tool of claim 2, wherein each of the punches includes a cutting edge, and wherein the counter-cutting edges are arranged in a pattern surrounding the cutting edges of the punches.

4. The ejector tool of claim 2, wherein the cutting tools are accommodated in the tool body so as to be movable relative to the lower tool portion, such that each of the cutting tools is optionally alignable with each of the counter cutting-edges.

5. The ejector tool of claim 1, wherein at least one of the cutting tools is configured such that a longitudinal central axis of its punch is arranged eccentrically relative to a longitudinal central axis of its guide body.

6. The ejector tool of claim 1, wherein the plurality of cutting tools are arranged in a pattern corresponding to a circle, and wherein longitudinal central axes of the punches are arranged with a radially outward offset in relation to the circle.

7. The ejector tool of claim 1, wherein at least one of the cutting tools comprises a round punch, and a cutting edge of the round punch can be aligned such that the cutting edge is tangent to the counter-cutting edge, and a normal of the counter-cutting edge intersects a longitudinal central axis of the guide body of the corresponding cutting tool.

8. The ejector tool of claim 1, wherein at least one of the cutting tools comprises a rectangular punch, and a cutting edge of the rectangular punch can be aligned such that the cutting edge is parallelwise relative to the counter-cutting edge of the punch, and a normal of the counter-cutting edge intersects a longitudinal central axis of the guide body of the corresponding cutting tool.

9. The ejector tool of claim 1, wherein the ejection opening has a plurality of counter-cutting edges and an indentation between two adjacent ones of the counter-cutting edges, wherein the indentation is an enlarged region of the ejection opening.

10. The ejector tool of claim 1, wherein at least one of the guide bodies includes a positioning device that positions the corresponding guide body in a torsion-resistant and axially displaceable manner in the basic tool body.

11. A plate-type workpiece part ejector tool, comprising:
   an upper tool portion comprising:
      a tool body, and
      a plurality of cutting tools carried by the tool body, each of the cutting tools comprising a guide body having a punch that includes a cutting edge; and
   a lower tool portion having a single ejection opening, the ejection opening having a plurality of counter-cutting edges arranged in a pattern surrounding the cutting edges of the punches,
   wherein the cutting tools are accommodated in the tool body so as to be movable relative to the lower tool portion, such that each of the cutting tools is optionally alignable with each of the counter cutting-edges.

12. The ejector tool of claim 11, wherein at least one of the cutting tools is configured such that a longitudinal central axis of its punch is arranged eccentrically relative to a longitudinal central axis of its guide body.

13. The ejector tool of claim 11, wherein the plurality of cutting tools are arranged in a pattern corresponding to a circle, and wherein longitudinal central axes of the punches are arranged with a radially outward offset in relation to the circle.

14. The ejector tool of claim 11, wherein at least one of the cutting tools comprises a round punch, and a cutting edge portion of the round punch can be aligned such that the cutting edge is tangent to a selected one of the counter-cutting edges, and a normal of the selected counter-cutting edge intersects a longitudinal central axis of the guide body of the corresponding cutting tool.

15. The ejector tool of claim 11, wherein at least one of the cutting tools comprises a square or rectangular punch, and a cutting edge of the rectangular punch can be aligned such that the cutting edge is parallelwise relative to a selected one of the counter-cutting edges of the punch, and a normal of the selected counter-cutting edge intersects a longitudinal central axis of the guide body of the corresponding cutting tool.

16. The ejector tool of claim 11, wherein the ejection opening has an indentation between two adjacent ones of the counter-cutting edges, wherein the indentation is an enlarged region of the ejection opening.

17. The ejector tool of claim 11, wherein at least one of the guide bodies includes a positioning device that positions the corresponding guide body in a torsion-resistant and axially displaceable manner in the basic tool body.

* * * * *